Dec. 23, 1969     J. R. SILVER     3,485,480

SOIL-CONDITIONING APPARATUS AND METHOD

Filed May 23, 1967     6 Sheets-Sheet 1

INVENTOR.
JOSEPH R. SILVER
BY Ely + Golrick

Dec. 23, 1969   J. R. SILVER   3,485,480
SOIL-CONDITIONING APPARATUS AND METHOD
Filed May 23, 1967   6 Sheets-Sheet 3

INVENTOR.
JOSEPH R. SILVER
BY Ely + Golrick

Dec. 23, 1969   J. R. SILVER   3,485,480
SOIL-CONDITIONING APPARATUS AND METHOD
Filed May 23, 1967   6 Sheets-Sheet 5

INVENTOR.
JOSEPH R SILVER
BY
Ely & Golrick

Dec. 23, 1969  J. R. SILVER  3,485,480

SOIL-CONDITIONING APPARATUS AND METHOD

Filed May 23, 1967  6 Sheets-Sheet 6

INVENTOR.
JOSEPH R. SILVER
BY Ely + Golrick

United States Patent Office 3,485,480
Patented Dec. 23, 1969

3,485,480
SOIL-CONDITIONING APPARATUS AND METHOD
Joseph R. Silver, Akron, Ohio, assignor, by mesne assignments, to Igelstroem-Oberlin, Inc., Massillon, Ohio, a corporation of Ohio
Filed May 23, 1967, Ser. No. 640,679
Int. Cl. B01f 15/04, 13/10; B28c 5/38
U.S. Cl. 259—9                                          37 Claims

ABSTRACT OF THE DISCLOSURE

Soil treatment apparatus and method in which soil components are preliminarily mixed in a pre-treatment chamber and then are compacted while passing into a treatment tube. Pressurized aerated steam is introduced into direct contact with the soil while it is being further mixed in the treatment tube. The amount of steam so introduced is controlled to produce a final soil mixture having a desired wet weight with respect to its dry weight.

---

This invention relates to apparatus and a method of conditioning pulverulent material, such as soils. The apparatus and method as specifically disclosed herein is a preferred and applied embodiment of this invention relating to the treatment of potting soils and the like so as to destroy most harmful viruses, bacteria, fungi, nematodes, insects, slugs, and like pathogenic fauna and their eggs; and weeds and weed seeds, all of which can cause plant disease or inhibit growth and productivity. On the other hand, the treatment does not destroy beneficial enzymes and non-pathogenic organisms which promote plant growth and productivity, apparently by making the nutrients in the soil available or more readily available to plants. The process and apparatus also enables the moisture content of the soil to be controlled in the course of such treatment so that, for a given soil, it will be in the optimum condition for receiving seeds, transplanted seedlings, cuttings, and the like at such a critical stage in the germination and/or growth of the desired plant.

The treatment of special soils by chemical fumigants or live steam has long been practiced in greenhouse and bedding operations and the like for the purpose of "sterilizing" the soil. It has also been recognized that, when the most beneficial results have been obtained, "sterilization" has been a misnomer; rather, such beneficial results were obtained by killing the harmful pathogenic contents of the soil without also killing or eliminating the beneficial contents or organisms, as would occur if the soil were actually "sterilized." Such selective reduction of the pathogenic content has been obtained by chemical fumigants or additives only at practically prohibitive cost and only with materials whose effectiveness is limited to specific pathogens; any chemical which was effective with respect to the broad spectrum of pathogens has also created a resultant toxicity for plants; in addition, such chemical treatments, particularly fumigation, can be extremely dangerous to personnel.

For the above reasons, the art has preferred to effect soil "purification" (as contrasted with "sterilization") by treatment with live steam. The advantage of steam treatment lies in the fortuity that, except for a very few resistant weed seeds and plant viruses which are only killed by temperatures in the range of 200–212° F. (which is also harmful to beneficial factors), the beneficial factors will survive temperatures of 180° F. whereas most viruses, and all pathogenic bacteria, molds and soil insects, worms, slugs, or like fauna are destroyed at 160° F. and most weed seeds can be killed in the range between 120 and 160° F. Since the very broad pathogenicidal effect of live steam is due primarly, if not entirely, to its temperature, there is no residual toxicity after the treated soil has cooled; and the beneficial soil contents are not destroyed, as could occur if the soil were baked at the required temperature by dry heat.

While theoretically preferable, steam purification of soils has heretofore been practical only in a very few locations, primarily abroad, where the economic need for intense cultivation of plants forced the adoption of the process. In practice such steam treatment had many drawbacks, principally as follows: Very large boilers, which were expensive from the point of view of equipment investment and operating costs, were required; either high equipment costs were involved in buried steam lines and/or high labor costs were involved in operating so called steam rakes by which steam was injected in the soil. Non-uniformity of the soil itself and its moisture content greatly reduced the effectiveness of the applied steam; despite the general practice of covering the beds, great losses of steam were encountered. Uniform treatment of the soil was not assured and subsequent tilling of the soil to prepare it for reception of seeds or seedlings, particularly if the soil were over-saturated by the condensed steam, could reinfect the soil and offset the degree of purification which was obtained.

It is an object of this invention to provide a method and apparatus for purifying soils which avoids or minimizes the foregoing faults of steam treatment. The economies obtained permit far more widesperead use of purified and conditioned soils; such economies are largely the consequence of the fact that all soil processed is treated uniformly, and neither over-treated nor under-treated and the amount of soil treated is precisely controlled. The danger of re-infection after treatment is eliminated or greatly reduced.

In general and broadly, the result of this invention results from the fact tht the soil is not treated in situ, but in apparatus through which the soil passes so as to insure controlled conditions for controlled amounts of soil and the media for treating it. Whereas prior methods of steam treatment required at least several hours, and sometimes days of steaming, a wide range of soils may now be effectively treated according to the method and in apparatus of this invention in a period of 12 to 20 minutes. The relatively low operating cost of this apparatus and the speed and effective treatment in it, more than offset the cost of moving the soil to and from the apparatus, in contrast with the prior practices of treating the soil in situ.

It is to be understood that this invention is not necessarily restricted to purifying soils for plant culture but may be adapted for other purposes and uses. Other objects and advantages of this invention will be apparent to those skilled in the art from the following specification, claims, and drawings, in which:

Figure 1:
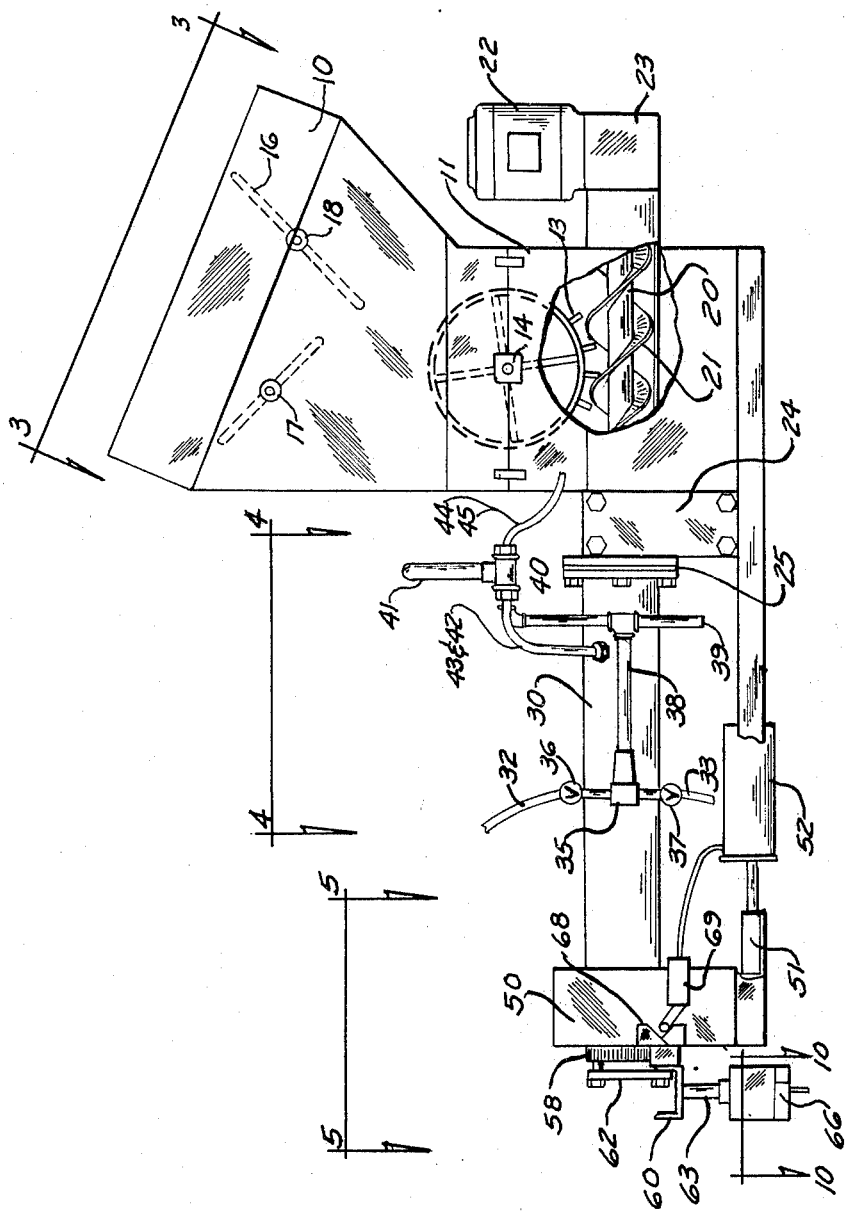
FIGURE 1 is a longitudinal side view of apparatus made and operated according to my invention.

Referring to the drawings and describing the use of the apparatus for preparing and packaging a potting soil, soil and the soil components to be added thereto are received in the hopper 10 in the requisite proportions, as determined by analysis of samples for moisture content, acidity, nutrient content, humus content, and particle size (compactability). As such, the soils may be simply basic mixtures of fine sand and peat or peat equivalents; usually the soils are either used greenhouse or bedding soils or raw top soils to which sand, vermiculite, and humus (in the form of peat moss, sawdust, wood shavings, grain hulls, etc.) are added to provide a desired texture. Lime or acidifiers are also usually added to provide the desired pH; and fertilizers can be added to provide the desired nutrients; likewise, it is within the expected skill of agrologists to add traces of hormones to induce rooting if the soil is to be used for cuttings, etc. Particularly if raw top soil is one of the components, the soils are preferably screened by conventional screening means, which may be located over the openings of the hopper 10, to remove stones or pieces of metal or wood before the soil enters the hopper 10.

Figure 2:
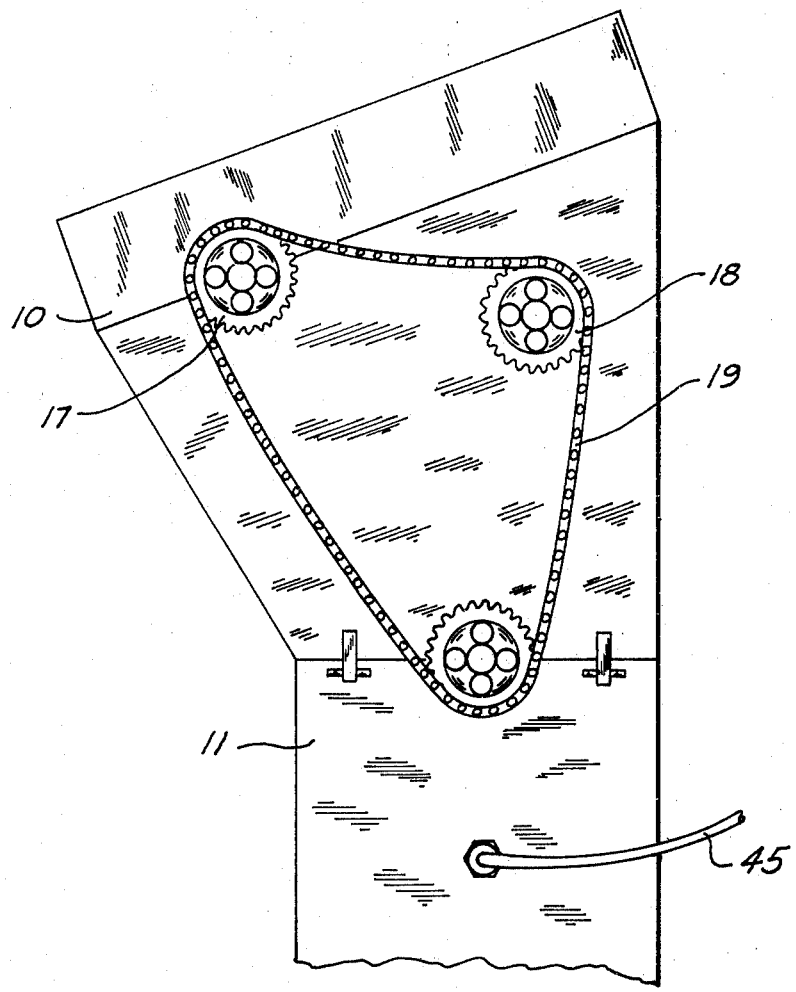
FIG. 2 is a detailed side view of the other side of the pre-treatment hopper shown in FIG. 1 and showing the drive for the mixing and stirring mechanism within the hopper.
Figure 3:
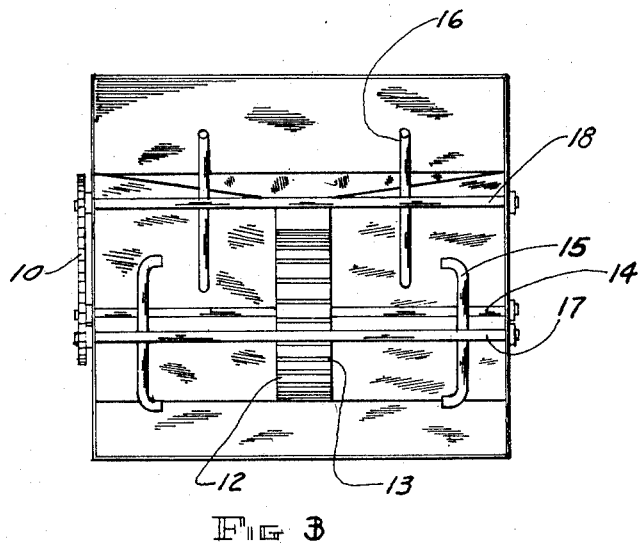
FIG. 3 is a detailed plan view, taken along the line 3—3 of FIG. 1, showing the mixing and stirring mechanism within the hopper.

The base of the hopper 10 opens into a pre-treating chamber 11 in the base of which is located an open auger flight 21 of the auger shaft 20, which extends through the length of the machine. The shaft 20 is driven by motor 22 through a reduction drive 23 mounted on the rear of the pre-treating chamber. Both to insure feed of soil to this first auger flight and to complete pre-mixing of the soil, a large pin gear 12 having transverse blades 13 (see FIG. 3) is mounted on a transverse shaft 14 in the base of the hopper, the gear 12 being driven by the engagement of its blades 13 in the auger flight 21. Auxiliary stirring paddles 15 and 16, mounted on the shafts 17 and 18 (see FIG. 3), are in turn driven from the shaft 14 by a chain and sprocket drive 19 (see FIG. 2), and further stir and mix the soil in the hopper 10.

The auger flight 21 moves the soil from the collection chamber 11 into a clean-out box 24 closed at its exit by a macerater plate 25, against the face of which the end of the blade turns to extrude soil through openings therein (not shown), the macerater plate being held between bolted flanges at the exit of the clean-out box and the entrance of the treatment tube 30. The macerater plate, having a central opening through which the shaft 20 passes, may be split diametrically to permit replacement by other plates having different extrusion openings for differently textured soils. The compaction of the soil as it is forced through the openings of the macerater plate allows pressure in excess of atmospheric to be maintained in the treatment tube 30. The clean-out box 24 is, of course, provided with a removable cover to permit the removal of stones and other large hard objects which may have escaped screening and the drive of the shaft 20 is likewise provided with a shear pin or overload clutch for protection in case the auger should become jammed.

As the soil is extruded through the macerater plate 25, it is in the form of rods or lumps which fall into the entrance of the treatment tube 30, where it is picked up by the second auger flight 31, which carries the soil down the tube 30 and discharges it into the plenum chamber 50. This second auger flight 31 may have interrupted blades and/or the pitch of the blades may change along the length of the shaft 20 within the tube in order to promote more thorough mixing of the soil with itself and the media introduced into the treatment tube.

The media introduced into the treatment tube is a mixture of air, supplied under pressure through the line 32, and steam, preferably dry and supplied under pressure from the line 33, the air and steam being mixed in the injection nozzle 35, the proportionate amounts of air and steam, the temperature thereof, and the total amount being controlled by the valves 36 in the line 32 and valve 37 in the line 33. From the injection nozzle 35, the mixed air and steam passes through a collection tube 38 to the riser 40, any condensate being drained through the line 39, which may be connected to a pressure vessel (not shown). It is at this point that nutrients, hormones, chemical pathenogicidal agents, pH controlling agents, and the like may also be added.

Figure 4:
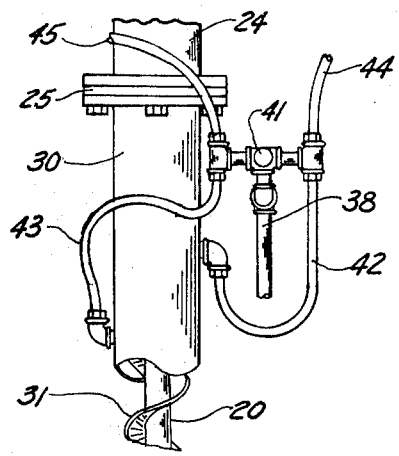
FIG. 4 is a detailed plan view, taken from the line 4—4 of FIG. 1, showing the manifolding arrangement for distributing the moist, heated air from the air-steam injector to the treating tube and to the pre-treating chamber of the hopper.

As best shown in FIG. 4, from the riser 40 the mixed air and steam usually at temperatures ranging between 120–160° F., as read by the thermometer 41, is divided between two lines 42 and 43 which are tapped into the treatment tube 30 near its entrance and two lines 44 and 45 connected through pressure regulators to the lines 42 and 43. The lines 44 and 45 are, in turn, tapped into the pre-treating chamber 11 and escape into the soil therein and in the hopper 10 to pre-condition that soil for subsequent treatment with aerated steam in the treatment tube 30. It is to be understood that, for ease of illustration, the normally employed insulation around the treatment tube and on the several steam lines is not shown.

With a soil of known moisture content and a set rate of feed, adjustment of the amounts and proportions of air and steam permit the discharged soil to have the desired moisture content (nearly always considerably higher than that of the soil introduced into the hopper). This adjustment can, due to condensation of the steam in the soil, be obtained while subjecting the soil in the treatment tube 30 to moist heat which raises the soil to the range of 120–160° F. The time the soil must remain in the tube while being subjected to moist heat to purify it will vary according to the nature of the soil and can be controlled by regulating the speed of the auger shaft. Apparently due to the intimate mixing and working of the soil with the moist heat provided, ample purification of most soils is achieved in 12 to 20 minutes.

After the treated soil is discharged from the tube 30, it should be prepared for use with a minimum handling. If the soil is to be returned to greenhouse or outdoor growing beds, it may be most economically handled in bulk. Such purified soil is most desirable, however, for individually potted transplanted seedlings, cuttings, etc., and, accordingly, the packaging of the soil in individual pots is best accomplished at the machine to minimize the possibility of re-infestation of the soil.

Figure 10:
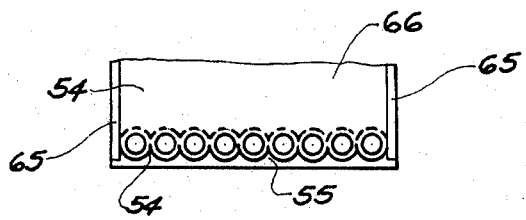
FIG. 10 is a fragmentary detail of the fixed charging plate taken along the line 10—10 of FIG. 6.

As shown in this embodiment, treated soil is discharged from the tube 30 into the upper part of a plenum chamber 50. A charge-forming plate 51, reciprocated by the hydraulic cylinder 52 moves across the bottom of the plenum cylinder 50, pushing soil ahead of it to for cylindrical slugs between the cusps 53 of the plate 51 and the corresponding cusps 54 of the fixed charge-forming plate 55 (see FIG. 10).

Figure 7:
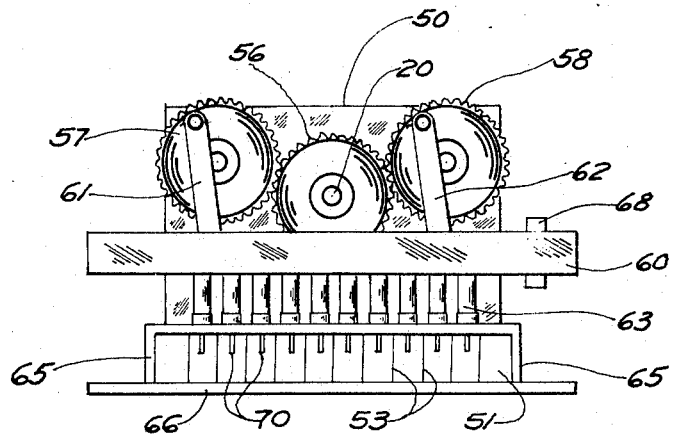
FIGS. 7 and 8 are detailed end views of the packaging mechanism carried by the plenum chamber for, in this embodiment, packaging soil in transplant pots. With the fixed charge-forming plate removed, these views show successive positions of the charging pistons.
Figure 8:
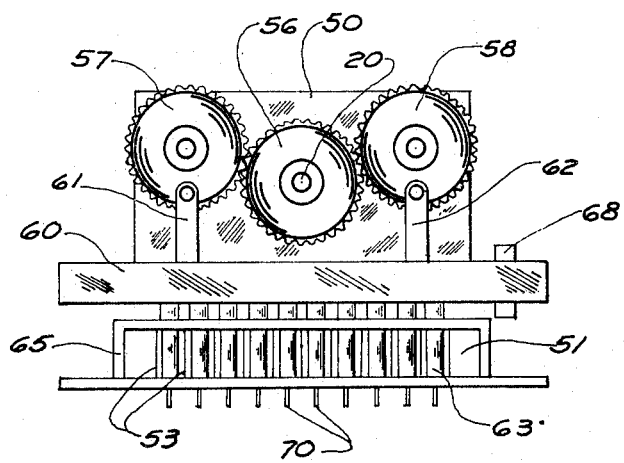

Referring to FIGS. 7 and 8, the end of the auger shaft 20 extending through the plenum chamber carries a gear 56. The gear 56 in turn drives two gears 57 and 58 which raise and lower a piston bar 60 by means of crank links 61 and 62. The several charging pistons 63 carried by the bar 60 are journaled in a guide plate 64 supported by the sides 65 on an orifice plate 66 having orifices 67 aligned with the pistons 63.

Figure 5:
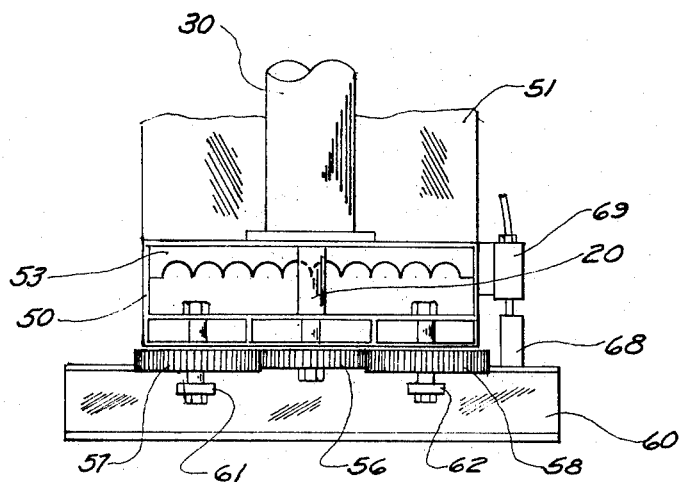
FIG. 5 is a detailed plan view, taken from the line 5—5 of FIG. 1, with the cover and internal distributing means removed, of the plenum chamber into which treated soil is discharged.

The piston bar 60 carries a pair of adjustable timing cams 68 which, in turn, actuate a toggle switch 69 for valves to the lines of the hydraulic cylinder 42. As the bar 60 is raised to its uppermost position as shown in FIG. 7, the toggle switch 69 is activated so as to drive the forming plate 51 forward into the dotted-line position shown in FIG. 10. The plate 51 remains in this position until the pistons have moved to their lowermost position shown in FIG. 8 and pushed through the orifices 67 a charge of soil gathered between the cusps 53 and 54. The toggle switch is then actuated to cause the plate 51 to withdraw to the position shown in FIG. 5, whereupon soil that had been distributed on the plate 51 while it was in its forward position will fall in front of the cusps 53 in position for the next charging cycle.

Figure 11:
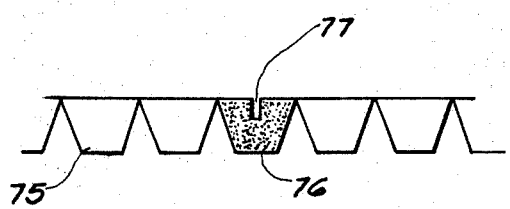
FIG. 11 is a detail elevation of a gang of transplant pots, partly broken away, showing a pot as charged by this embodiment with purified soil prepared to receive a seedling.

It is to be noted that each piston 63 carries a protruding finger 70 so that when a gang of pots 75 is pressed under the orifice plate 66 to receive a charge of soil 76, the finger 70 will form a depression 77 for receiving a seedling, as shown in FIG. 11, while guiding the charges of soil into the pots.

Figure 6:
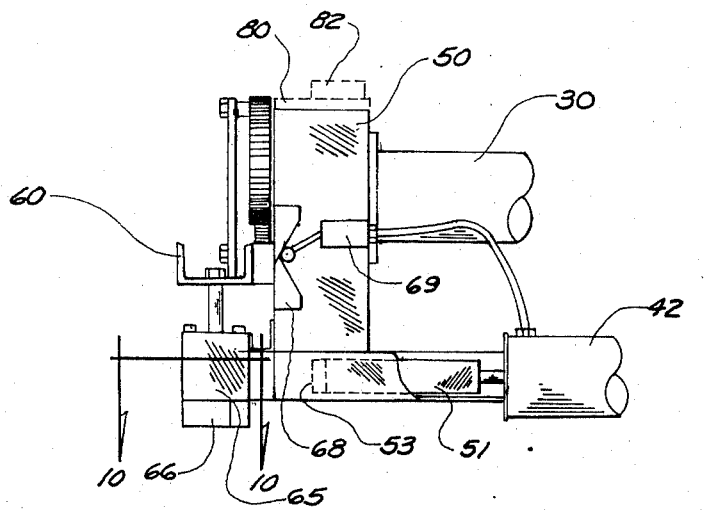
FIG. 6 is a detail side view of the plenum chamber shown in FIG. 5.
Figure 9:
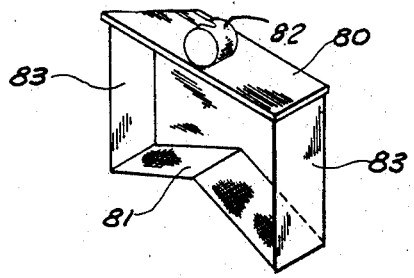
FIG. 9 is a detailed elevation of the plenum chamber cover and one form of an internal distributing means which may be employed.

In order to charge each pot in a gang 75 with an equal amount of soil, it should be apparent that the soil discharged into the plenum chamber 50 should be evenly distributed over the bottom of it. Several means may be employed to accomplish this result. A simple and usually effective means is shown in perspective in FIG. 9 and comprises a cover 80 for the plenum chamber 50. Supported below the cover is a roofed distributing screen 81 which is vibrated by the vibrator 82 mounted on top of the cover. The cover 80 is placed, as shown in dotted lines in FIG. 6, on the plenum chamber 50 so that the peak of the roofed screen 81, supported by the side panels 83, will be positioned within the plenum chamber beneath the exit end of the treatment tube 30. As treated soil discharged from the tube 30, the shaking screen 81, driven by the vibrator 82, distributes the soil over the bottom of the chamber. The vibrator 82 may be powered by compressed air or electrically driven, being connected to a suitable source of power (not shown). Different soils, for even distribution, may require screens 81 of different meshes and/or slopes; if the soil or like materials being treated are extremely moist or compacted as they are discharged from the treatment tube so as to require more positive action to break up and distribute the material within the plenum chamber, powered impellers or moving baffles may be suspended in the chamber in place of the screen 81.

What is claimed is:

1. Apparatus for treating pulverulent materials comprising hopper means for receiving the principal components of said materials, stirring means within said hopper means for preliminarily breaking up and commingling said components, a pre-treatment chamber receiving said components from said hopper, a treatment tube connected to said pre-treatment chamber, a first auger flight for further commingling said components while conveying the same from said pre-treatment chamber and forcing them under pressure into said treatment tube, a second auger flight within said tube for further commingling and driving said components to the exit of said tube, and conduit means for introducing a treating fluid under pressure into said treatment tube and into direct contact with said components at a location nearer the entrance than the exit end of said treatment tube, said treating fluid being maintained under pressure by the compaction of said material being forced into said treatment tube and the resistance of treated material confined in the fluting of said second auger flight and the wall of aid tube between said location of introduction of said treating fluid and the exit end of said tube.

2. Apparatus as called for in claim 1 including valve means to control the pressure of treating fluid in said means for introducing the same into said treatment tube to a pressure not substantially exceeding the pressure maintainable in said treatment tube at the location of introduction of the fluid.

3. Apparatus a defined in claim 2 including an apertured macerator plate, mounted between said pre-treatment chamber and the location in said treatment tube where said treatment fluid is introduced, said components being forced by said first auger flight through the apertures of said macerater and the compaction of said components while being forced through said plate aiding in maintaining the pressure of said treatment fluid.

4. Apparatus as defined in claim 3 including conduit means for bleeding treatment fluid into said pre-treatment chamber.

5. Apparatus as defined in claim 4 for treating soil ex situ including a plenum chamber, and means for measuring and discharging such soil in charges of substantially equal volume from said plenum chamber into receptacles, whereby re-infestation of said treated soil is minimized.

6. Apparatus as defined in claim 5 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge, and means to discharge said formed charge from said chamber.

7. A soil treating device as defined in claim 6 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

8. Soil treating apparatus as defined in claim 7, including a protruding finger on a piston to guide a charge as it is discharged and to form a depression in the upper surface of a charge of soil to receive an object to be planted therein.

9. Apparatus as defined in claim 3 for treating soil ex situ including a plenum chamber, and means for measuring and discharging such soil in charges of substantially equal volume from said plenum chamber into receptacles, whereby re-infestation of said treated soil in minimized.

10. Apparatus as defined in claim 9 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge, and means to discharge said formed charge from said chamber.

11. A soil treating device as defined in claim 10 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

12. Soil treating apparatus as defined in claim 11, including a protruding finger on a piston to guide a charge as it is discharged and to form a depression in the upper surface of a charge of soil to receive an object to be planted therein.

13. Apparatus as defined in claim 3 for treating soil ex situ including means for commingling air and steam under pressure connected to said conduit, and valving means for controlling the degree of aeration of said steam introduced into said treatment tube.

14. Apparatus as defined in claim 13 for treating soil ex situ including a plenum chamber, and means for measuring and discharging such soil in charges of substantially equal volume from said plenum chamber into receptacles, whereby re-infestation of said treated soil is minimized.

15. Apparatus as defined in claim 14 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge, and means to discharge said formed charge from said chamber.

16. A soil treating device as defined in claim 15 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

17. Soil treating apparatus as defined in claim 16, including a protruding finger on a piston to guide a charge as it is discharged and to form a depression in the upper surface of a charge of soil to receive an object to be planted therein.

18. Apparatus as defined in claim 2 for treating soil ex situ including means for commingling air and steam under pressure connected to said conduit, and valving means for controlling the degree of aeration of said steam introduced into said treatment tube.

19. Apparatus as defined in claim 18 for treating soil ex situ including a plenum chamber, and means for measuring and discharging such soil in charges of substantially equal volume from said plenum chamber into receptacles, whereby re-infestation of said treated soil is minimized.

20. Apparatus as defined in claim 19 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge, and means to discharge said formed charge from said chamber.

21. A soil treating device as defined in claim 20 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

22. Soil treating apparatus as defined in claim 21, including a protruding finger on a piston to guide a charge as it is discharged and to form a depression in the upper surface of a charge of soil to receive an object to be planted therein.

23. Apparatus as defined in claim 2 for treating soil ex situ including a plenum chamber, and means for measuring and discharging such soil in charges of substantially equal volume from said plenum chamber into receptacles, whereby re-infestation of said treated soil is minimized.

24. Apparatus is defined in claim 23 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge, and means to discharge said formed charge from said chamber.

25. A soil treating device as defined in claim 24 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

26. Soil treating apparatus as defined in claim 25, including a protruding finger on a piston to guide a charge as it is discharged and to form a depression in the upper surface of a charge of soil to receive an object to be planted therein.

27. Apparatus as defined in claim 1 for treating soil ex situ including a plenum chamber, and means for measuring and discharging such soil in charges of substantially equal volume from said plenum chamber into receptacles, whereby re-infestation of said treated soil is minimized.

28. Apparatus as defined in claim 27 including a reciprocal charging plate located on the bottom of said plenum chamber and having a re-entrant charge-forming edge, a fixed stop member, said plate being movable from a position where soil falls ahead of said edge to a position where said edge can compact soil against said stop member to form a charge and means to discharge said formed charge from said chamber.

29. A soil treating device as defined in claim 28 in which said charging plate edge is provided with a plurality of re-entrant surfaces and said stop member is provided with opposed matching re-entrant surfaces, discharge pistons reciprocal transversely to the movement of said charging plate and aligned to pass into the spaces between the re-entrant edges of said charging plate and said stop member when said charging plate is adjacent said stop member, and means to time the reciprocation of said discharge pistons to the reciprocation of said charging plate to clear the pistons from said matching re-entrant edges as said charging plate moves toward said stop member and to drive said pistons into the spaces between said charging plate and stop member while said plate is held adjacent said stop member, whereby a plurality of formed charges are discharged from said apparatus.

30. Soil treating apparatus as defined in claim 29, including a protruding finger on a piston to guide a charge as it is discharged and to form a depression in the upper surface of a charge of soil to receive an object to be planted therein.

31. A method of preparing pulverulent material comprising the steps of preliminarily mixing initial charges of soil components in a pre-treatment chamber, the dry weight of the proportions of said initial charges to each other being adjusted to the desired dry weights of the components in the final substantially homogeneous mixture; compacting said preliminarily mixed components while passing the same into a treatment tube, introducing an aerated treatment fluid into direct contact with said components and under pressure while further mixing said components in said treatment tube, controlling the amount of treatment fluid introduced into said tube with respect to the wet weight of the components to produce a final mixture having the required wet weight with respect to its dry weight; and discharging said mixture from said tube.

32. A method of treating soil ex situ as defined in claim 31 in which said treatment fluid is aerated steam and the temperature thereof is sufficient to raise the mixture of soil components to a temperature of at least 120° F. and the heated soil is retained within said treatment tube until pathogenic organisms in said components are reduced to a desired level in said final mixture.

33. The method of treating soil as defined in claim 32 in which the weight of water in the aerated steam introduced into said treatment tube is adjusted with respect to the initial wet weight of said components to produce a final mixed soil of the desired moisture content and the temperature of the aerated steam is adjusted to raise the temperature of the soil in said treatment tube to at least the range of 120 to 160° F. by controlling the temperature and proportion of air introduced into said steam prior to introduction of said aerated steam into contact with said soil.

34. The process of treating soil as defined in claim 33 including the steps of maintaining said aerated steam under pressure while the same is introduced into direct contact with the soil in said treatment tube by compacting the soil as it is passed from said pre-treatment chamber to said treatment tube and maintaining resistance to discharge of said soil from said tube beyond the location of introduction of said steam.

35. The method of treating soil as defined in claim 34 including the step of bleeding aerated steam into direct contact with said soil components while the same are in said pre-treatment chamber.

36. The method of packaging potting soil for reception of seeds, seedlings, cuttings and the like comprising the steps of treating soil as defined in claim 32, forming the final mixed and treated soil into measured charges, and discharging the same into pots.

37. The method as defined in claim 36 including the step of adding nutrients and/or growth-promoters to said soil during said treatment.

References Cited
UNITED STATES PATENTS

| | | | |
|---|---|---|---|
| 2,366,673 | 1/1945 | Paley | 259—9 X |
| 3,006,615 | 10/1961 | Mason | 259—9 X |
| 3,183,553 | 5/1965 | Slater | 259—9 X |

ROBERT W. JENKINS, Primary Examiner

U.S. Cl. X.R.

259—21, 151